(12) United States Patent
Chew

(10) Patent No.: US 6,462,913 B1
(45) Date of Patent: Oct. 8, 2002

(54) DISK DRIVE LATCHING ASSEMBLY

(75) Inventor: David W. Chew, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 35 days.

(21) Appl. No.: 09/670,265

(22) Filed: Sep. 26, 2000

Related U.S. Application Data

(60) Provisional application No. 60/156,428, filed on Sep. 28, 1999.

(51) Int. Cl.⁷ ............................................... G11B 21/22
(52) U.S. Cl. ................................................ 360/256.2
(58) Field of Search ............................ 360/256, 256.2, 360/256.3

(56) References Cited

U.S. PATENT DOCUMENTS

| | | | | |
|---|---|---|---|---|
| 4,573,556 A | * | 3/1986 | Andreasson | 188/137 |
| 4,712,027 A | * | 12/1987 | Karidis | 310/12 |
| 5,117,318 A | * | 5/1992 | Immler et al. | 360/105 |
| 5,303,101 A | * | 4/1994 | Hatch et al. | 360/105 |
| 5,381,290 A | * | 1/1995 | Cheng | 360/105 |
| 5,404,257 A | * | 4/1995 | Alt | 292/229 |
| 5,414,577 A | * | 5/1995 | Arin et al. | 360/256.3 |
| 5,477,403 A | * | 12/1995 | Strickler | 360/105 |
| 5,636,090 A | * | 6/1997 | Boigenzahn et al. | 360/256.4 |
| 6,198,603 B1 | * | 3/2001 | West | 360/256 |
| 6,317,296 B1 | * | 11/2001 | Stefansky et al. | 360/256.2 |

* cited by examiner

Primary Examiner—Brian E. Miller
Assistant Examiner—Dzung C. Nguyen
(74) Attorney, Agent, or Firm—Sheridan Ross P.C.

(57) ABSTRACT

A disk drive includes a base, an actuator pivotally mounted on the base, a motor and a hub for supporting the disk or disks of the drive. A rotatable member disposed on the base includes a latch that cooperates with a hook on the actuator and a magnet that cooperates with a ferromagnetic segment disposed between the rotatable member and the motor. When the motor does not operate, this rotatable member moves to a predetermined position in which the latch engages a hook portion on the actuator. When the motor does operate, the magnetic field that it generates overcomes the force of the magnet and allows the rotatable member to move out of the locking position.

15 Claims, 3 Drawing Sheets

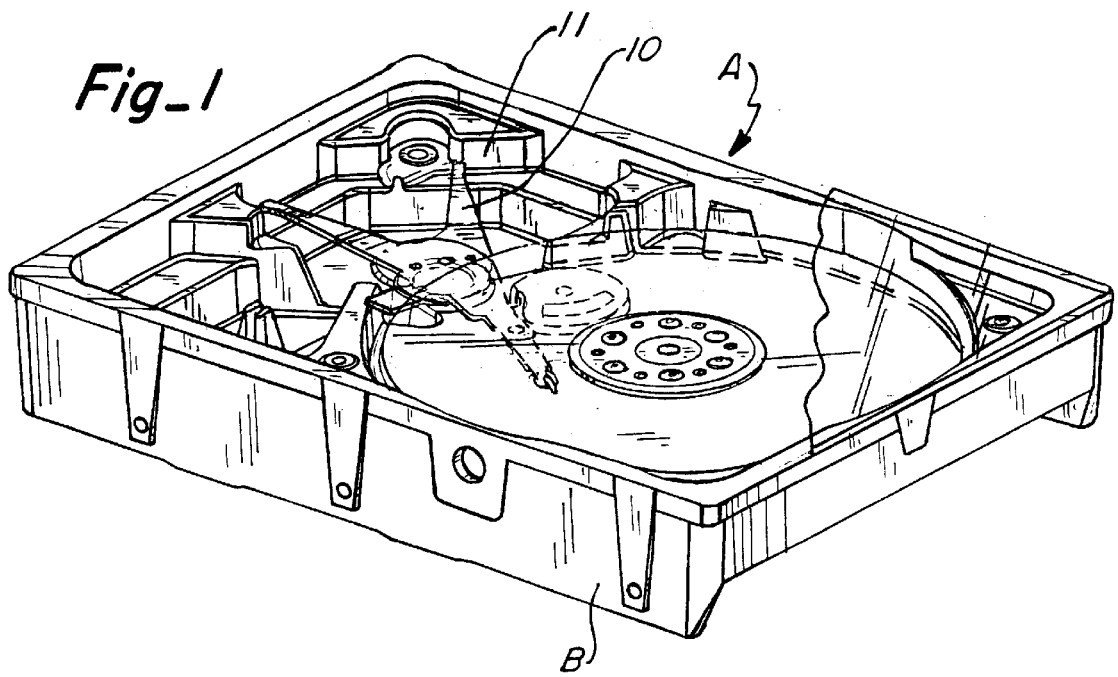
Fig_1
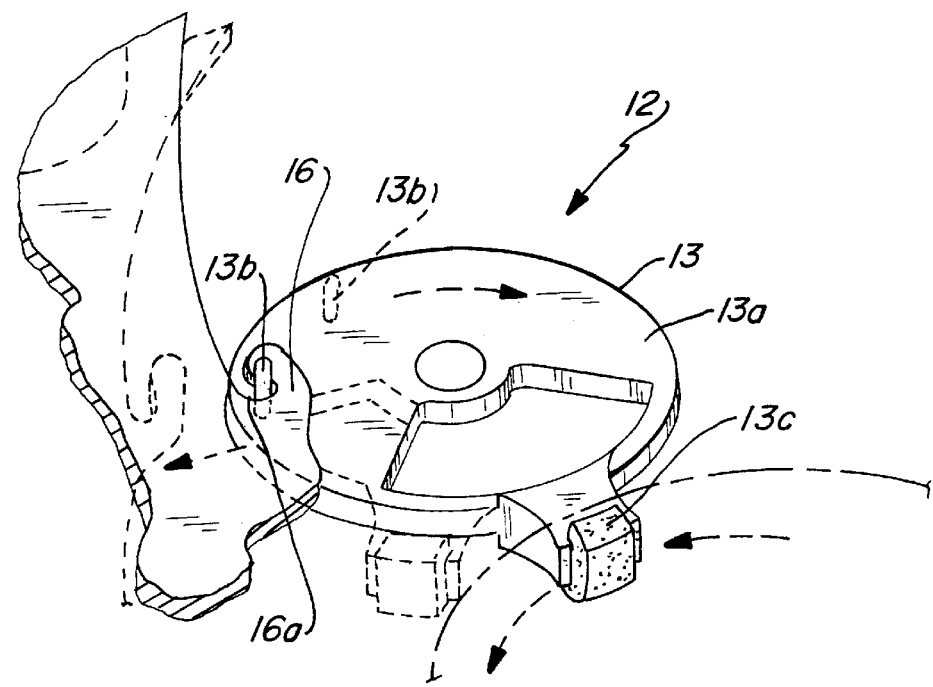
Fig_2

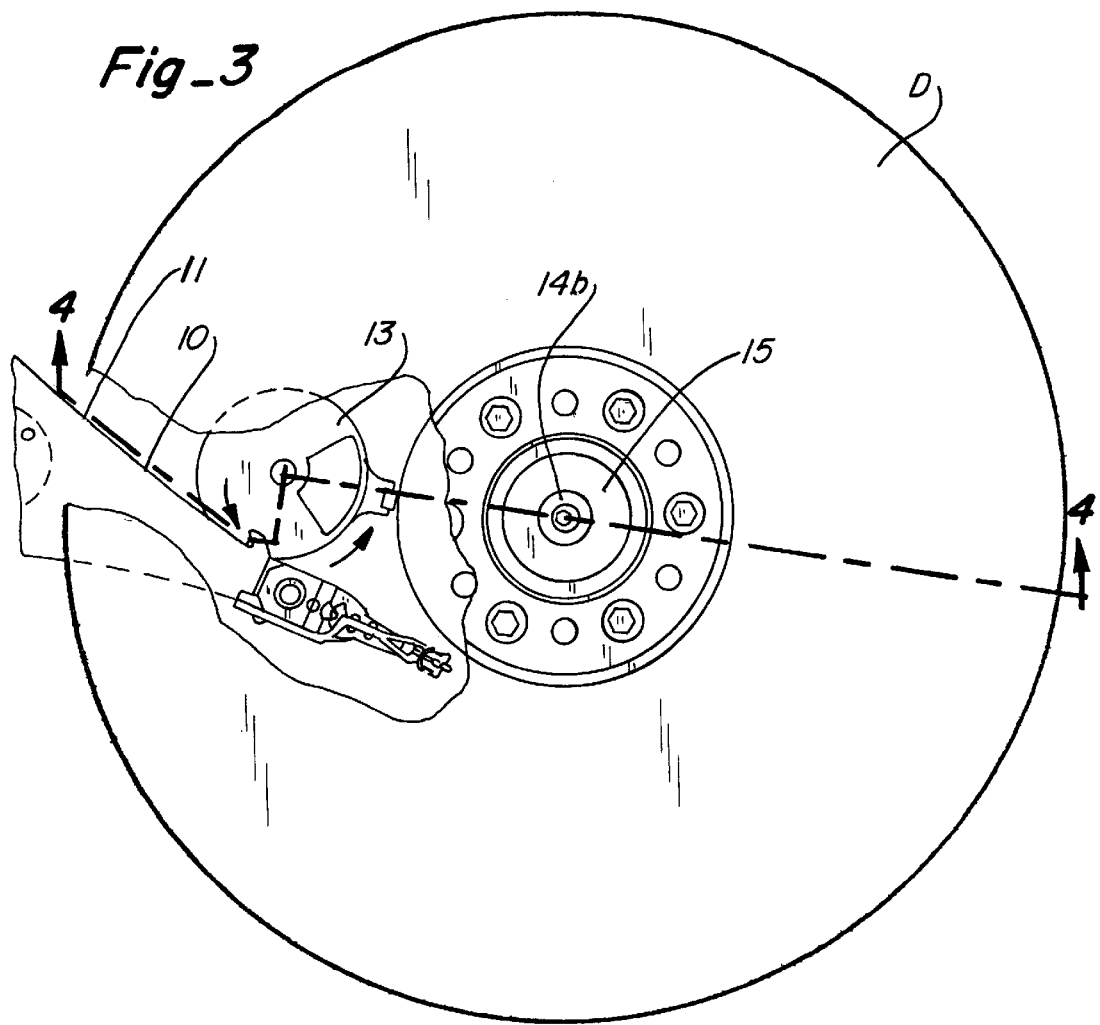
Fig_3
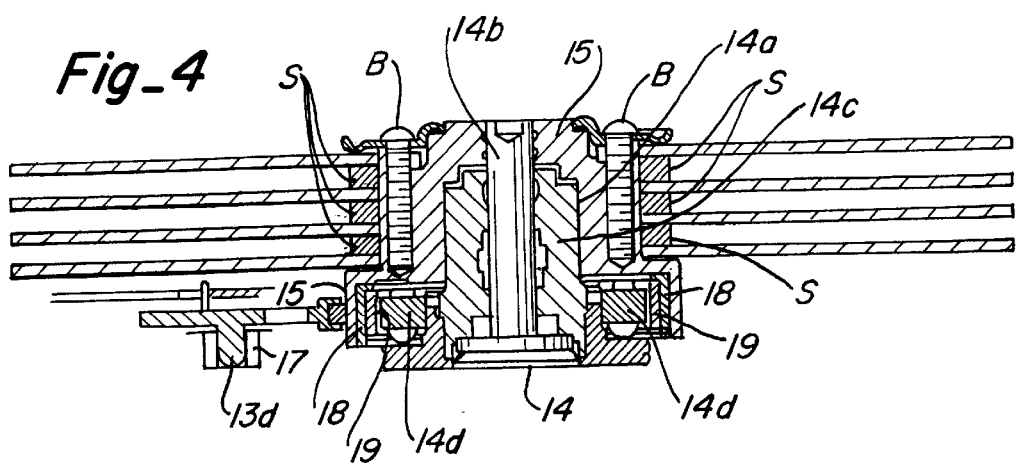
Fig_4

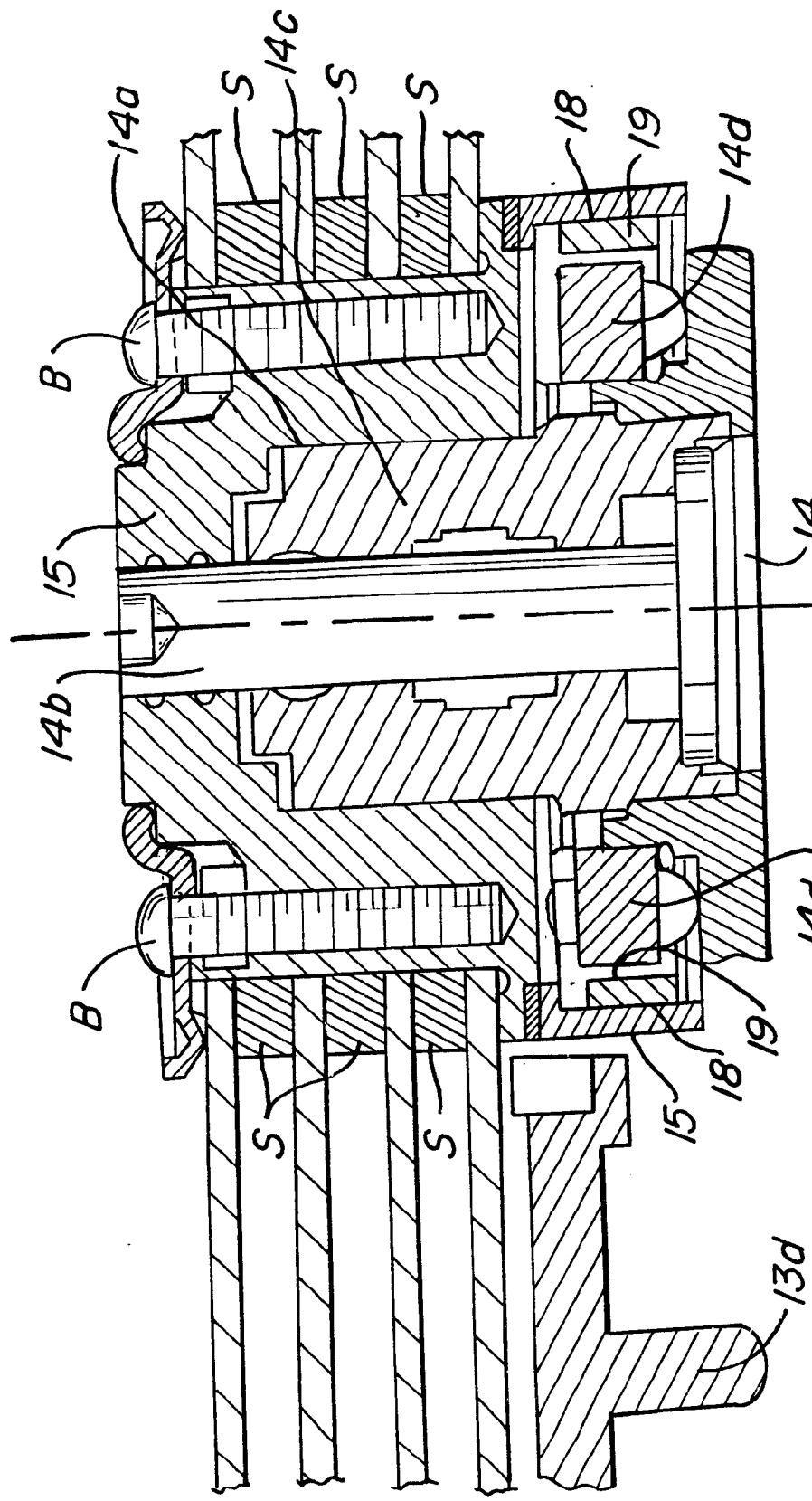

DISK DRIVE LATCHING ASSEMBLY

RELATED APPLICATIONS

The present application claims priority under 35 U.S.C. §119(e) from U.S. Provisional Patent Application Ser. No. 60/156,428, filed Sep. 28, 1999, which provisional application is incorporated herein by reference in its entirety.

BACKGROUND OF THE INVENTION

1. Field of the Invention

The present invention relates to disk drives for the mass storage of information in computer systems, and more particularly to an actuator latching assembly that releasably secures the actuator in a predetermined position when the disk drive remains inoperative and automatically releases the actuator upon activation of the motor of the drive.

2. Description of the Prior Art

A disk drive that provides mass storage of information in computer systems typically includes a disk or a stack of disks and a hub mounted on a rotatable spindle. An actuator controls an array of transducers that write and read binary digital information on the disks. During operation of the disk drive, the actuator rotates about a pivot in response to electromagnetic forces generated by a voice coil motor and places the transducers in desired positions. When the drive does not operate, a latching assembly normally secures the actuator in a predetermined position to protect it and the other components of the drive.

Prior disk drives have included various latching assemblies, including conventional magnetic latches, solenoid latches, and inertial latches. These prior latches suffer a number of disadvantages. For example, conventional magnetic latches require biasing forces on the actuator during latching and unlatching procedures. Prior solenoid latches require electrical power; and inertial latches do not operate under all shock conditions.

The latching assembly of the present invention avoids the disadvantages of the prior art. It provides a positive locking action when the disk drive remains inoperative and automatic release of the actuator upon activation of the drive motor. It is a simple construction that minimizes the expense of fabrication and assembly; and it provides consistent and precise locking and unlocking actions.

SUMMARY OF THE INVENTION

In accordance with one embodiment of this invention, a disk drive includes a base, an actuator pivotally mounted on the base, a motor and a hub for supporting the disk or disks of the drive. A rotatable member disposed on the base includes a latch that cooperates with a hook on the actuator and a magnet that cooperates with a ferromagnetic segment disposed between the rotatable member and the motor. When the motor stops, this rotatable member moves to a predetermined position in which the latch engages a hook portion on the actuator. It remains in this position while the motor remains inoperative. Upon activation of the motor, an electromotive force develops between the motor and the rotatable member, causing the rotatable member to move out of the locking position. The rotatable member remains in this unlocked position while the motor operates.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a partial perspective view of a disk drive that includes the latching assembly of the present invention;

FIG. 2 is a partial perspective view of the latching assembly of the present invention;

FIG. 3 is a plan view of the disk and spindle motor portion of the drive with the disks partially cut away to show the latching assembly; and FIG. 4 is a sectional view taken along line 4—4 in FIG. 3.

FIG. 5 is a sectional view, similar to FIG. 4, of an alternative embodiment of the present invention.

While the following disclosure describes the invention in connection with one embodiment, one should understand that the invention is not limited to this embodiment. Furthermore, one should understand that the drawings are not to scale and that graphic symbols, diagrammatic representatives, and fragmentary views, in part, may illustrate the embodiment. In certain instances, the disclosure may not include details which are not necessary for an understanding of the present invention such as conventional details of fabrication and assembly.

DETAILED DESCRIPTION OF THE DRAWINGS

Turning now to the drawings and referring to FIG. 1, a disk drive apparatus A includes an actuator 10 with an arm 11 that lies pivotally mounted on a base B of the disk drive apparatus. A voice coil assembly (not shown) drives the actuator 10 to various positions over a disk or disks D during operation of the disk drive apparatus A. While the apparatus A remains inoperative, the latching assembly of the present invention 12 (See FIGS. 2–4) releasably secures the actuator in a predetermined position to protect the actuator as well as the other components of the disk drive.

The latching assembly 12 generally includes a rotatable member 13, a spindle motor 14, a spindle hub 15, and a hook portion 16 of the actuator arm 11. The rotatable member 13 is made out of plastic or any other suitable non-ferromagnetic material, a protruding latch segment or pin 13b, and a permanent magnet 13c. In the illustrated embodiment it is flat and disk-like in shape, although other shapes would perform acceptably too. A pivot portion 13d of the body 13a extends outwardly and downwardly of the bottom face of the body 13a into a hole in the base B to pivotally mount the body 13a to the base. The pin 13b extends outwardly and upwardly of the top face of the body 13a. (However, it should be appreciated that the directions the pins protrude can be modified.) The magnet 13c lies fixedly secured as with adhesive to a protruding edge portion of the body 13a adjacent an opening 13e in the body 13a. (The opening 13e compensates for the additional weight of the protruding portion to provide a balanced body.)

The rotatable member 13 rotates between a first, locking position shown in solid lines in FIG. 2 and a second, unlocked position. In the locked position, the pin 13b extends through a groove 16a of the hook portion 16 of the actuator arm; and the magnet 13c lies next to the hub 15 (as shown in FIG. 4) without contacting it. In this position, the magnetic field generated by the magnet 13c attracts a ferromagnetic element 18 (e.g., motor backiron) of the hub 15 and releasably secures the rotatable member 13 in the locking position. When one activates the motor 14, electromotive force generated by eddy currents in the motor hub as it moves through the field of the latch magnet drives the rotatable member 13 to the unlocked position.

The motor 14 comprises a rotor 14a including a spindle 14b, a winding 14c supported by the spindle, and a stator 14d. The hub 15 lies over these components fixedly secured to the top end of the spindle 14b. It is a cap-like member that defines a cavity for containing the motor, thus serving as a motor housing. It also serves as a hub for the disks D, extending through central openings in the disks D and in spacers S that separate the disks. (Bolts B secure the disks D in place on the hub 15 and prevent relative movement between the hub 15 and the disks.) The hub 15 is made of aluminum or any other suitable non-ferromagnetic material with sufficient electrical conductivity to carry the required eddy currents. It extends between the rotatable member 13 and the stator 14d. It also supports the ferromagnetic element or "backiron" 18 which lies between the hub and the stator 14d and a permanent magnet 19 that lies between the element 18 and the stator 14d.

While the motor 14 remains inoperative, the magnet 13c attracts the backiron 18 behind the hub 15, and maintains the rotatable member 13 in a position with the pin 13b capturing the hook 16 in the actuator arm 11. Upon activation of the motor 14, the eddy currents in the hub 15 move through the magnetic field of the magnet 13c, creating an electromotive force between the hub 15 and the magnet 13c. This force exceeds the force of between the magnet and the backiron 18, causing the rotatable member 13 to rotate to a position where the actuator hook 16 lies free from the latch pin 13b. When the spindle motor 14 spins down or stops, the force due to the eddy current movement subsides, and the force between the magnet 13c and backiron 18 rotates the rotatable member 13 back to the locking or latched position, with the pin 13b engaged with the hook 16.

The magnet 13c lies at a sufficient distance from the disk(s) and head of the disk drive, such that data erasure and/or head hard biasing does not occur. The rotatable member 13 is a statically mass-balanced element that avoids movement under linear shock; and it has low rotational inertia to resist motion under rotational shock. One may vary the size of the magnet 13c and its position to achieve latching and unlatching action at a desired spindle speed. This procedure requires balancing the radial force between the magnet 13c and the backiron 18 and the velocity-induced force between the magnet 13c and the hub 15.

An alternative embodiment is illustrated in FIG. 5. In this embodiment, the rotatable member 13 is caused to move due to eddy currents created by the spindle motor in the recording disk, rather than in the spindle motor hub skirt as in the embodiment of FIGS. 1–4. More specifically, the magnet 13c is positioned adjacent a surface of the disk in order to interact with the eddy currents circulating in the conductive (aluminum) disk. In this embodiment, the other elements of the latching mechanism remain the same.

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A latching assembly for releasably securing an actuator of a disk drive to a base of the disk drive, said disk drive including an actuator, a hub for receiving at least one disk, and a motor for driving the hub, said latching assembly comprising: a rotatable member spaced from the actuator including a protruding latch segment and a magnet segment disposed at an edge portion of the rotatable member, the hub including a corresponding segment that cooperates with the magnetic segment of the rotatable member to releasably secure the rotatable member at a first position in which the latch segment of the rotatable member engages a hook portion of the actuator to releasably secure the actuator in a predetermined position; the motor being disposed proximate the rotatable member to allow the eddy current electromotive force generated between the motor hub and latch magnet when the motor is activated to overcome the magnetic field of the magnet segment and release the actuator.

2. The latching assembly of claim 1, wherein the rotatable member comprises a body mass-balanced about its center of rotation and the protruding latch segment comprises a pin that extends generally perpendicularly to a face of the body.

3. The latching assembly of claim 2, wherein the magnetic segment is a permanent magnet secured to an edge portion of the body, the magnetic segment being substantially smaller than the body.

4. The latching assembly of claim 1, wherein the hub includes a non-ferromagnetic skirt segment that defines a cavity for receiving the motor, the corresponding segment being ferromagnetic and disposed inside the cavity between a stator of the motor and the skirt segment.

5. The latching assembly of claim 4, wherein the hub is fixedly secured to a rotor of the motor.

6. The latching assembly of claim 1, wherein the hook portion of the actuator is a groove defined by an edge portion of the actuator.

7. In combination with a base, actuator, motor and hub of a disk drive, a rotatable member including a latch and a magnet, the latch cooperating with a hook of the actuator to releasably secure the actuator in a predetermined position, the magnet cooperating with a ferromagnetic segment disposed between the rotatable member and the motor to releasably secure the rotatable member in a position where the latch of the rotatable member engages the hook of the actuator, the eddy current electromotive force generated between the motor hub and the latch magnet during operation overcoming the force of the magnet so that the rotatable member releases the actuator.

8. The combination of claim 7, wherein the rotatable member includes a body pivotally mounted to the base, the latch being a pin that extends generally perpendicularly to the body, and the magnet being secured to an edge portion of the body.

9. The combination of claim 8, wherein the rotatable member includes a protrusion that extends generally perpendicularly to the body in a direction opposite that of the latch pin, said protrusion extending into an opening in the base of the disk drive to rotatably mount the rotatable member to the base.

10. The combination of claim 7, wherein the hub includes a non-ferromagnetic skirt segment that defines a cavity for receiving the motor, the ferromagnetic segment being disposed on the skirt segment in the cavity.

11. The combination of claim 10, wherein the ferromagnetic segment lies between the skirt segment of the hub and a stator of the motor.

12. The latching assembly of claim 10, wherein the hub is fixedly secured to the motor's rotor.

13. The latching assembly of claim 7, wherein the hook of the actuator is a groove defined by an edge portion of the actuator.

14. A latching assembly for releasably securing an actuator of a disk drive of the type having a motor hub and at least one data storage disk mounted thereto, said assembly comprising:

a rotatable member mounted adjacent the motor hub and spaced from the actuator, the rotatable member including a magnet attached thereto;

a hook member mounted on the actuator and positioned to engage the rotatable member;

means disposed on an exterior portion of the motor hub for creating a magnetic field in conjunction with said magnet, wherein the magnetic field causes the rotatable member to rotate to a first position in which the hook member engages the rotatable member thereby securing the actuator in a predetermined position, and wherein an eddy current electromotive force is generated between the motor hub and the magnet when the motor is activated to overcome the magnetic field and to thereby release the actuator.

15. A method of latching an actuator arm of disk drive of the type including a motor hub and at least one data storage disk mounted thereto, said method comprising the steps of:

positioning a rotatable member in close proximity to the motor hub, the rotatable member including a magnet, and the motor hub including a ferro-magnetic element cooperating with the magnet;

creating a magnetic field between the magnet and the ferro-magnetic element whereby the rotatable member remains in a first position to latch the actuator;

starting the motor hub causing rotation of the motor hub;

creating an eddy current electromotive force by operation of the hub; and rotating the rotatable member to a second unlatched position in response to the eddy current electromotive force, whereby the eddy current electromotive force overcomes the magnetic field.

\* \* \* \* \*